Figures 1, 2:
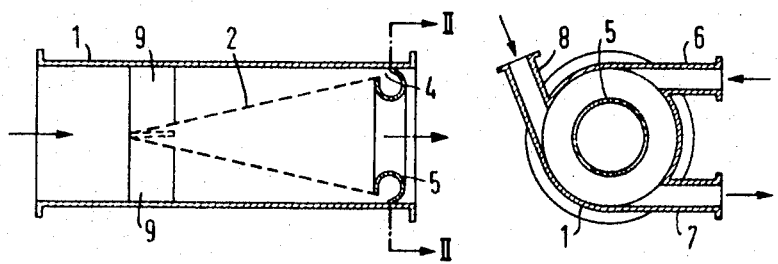

United States Patent

[11] 3,537,593

[72] Inventors Klaus Ruthrof and
 Gerhard Schwarzer, Erlangen, Germany
[21] Appl. No. 767,146
[22] Filed Oct. 14, 1968
[45] Patented Nov. 3, 1970
[73] Assignee Siemens Aktiengesellschaft
 Berlin and Munich, Germany
 a corporation of Germany
[32] Priority Oct. 14, 1967
[33] Germany
[31] 1,611,143

[54] DEVICE FOR SEPARATING SOLID BODIES FROM FLUID STREAMS
 3 Claims, 2 Drawing Figs.
[52] U.S. Cl. ................................................ 210/409,
 210/448
[51] Int. Cl. ............................................ B01d 29/42
[50] Field of Search ........................................ 210/448,
 304, 512, 409

[56] References Cited
UNITED STATES PATENTS

| | | | |
|---|---|---|---|
| 1,854,282 | 4/1932 | Thornhill .................... | 210/448X |
| 2,779,478 | 1/1957 | Wahlin ....................... | 210/448X |
| 3,061,098 | 10/1962 | Brezinski .................... | 210/304X |

Primary Examiner—Reuben Friedman
Assistant Examiner—T. A. Granger
Attorney—Curt M. Avery, Arthur E. Wilfond, Herbert L. Lerner and Daniel J. Tick

ABSTRACT: Described is a device for continuous separation of solid objects from liquid currents in pipelines wherein a conical sieve, with its apex pointing against the flow direction, is installed into the pipeline. The resulting annular clearance between the sieve base and the inside wall of the pipeline is widened at its narrowest point into a torus-shaped channel. The torus-shaped channel is located partly or completely inside the conical sieve.

DEVICE FOR SEPARATING SOLID BODIES FROM FLUID STREAMS

It is recognized that the normally provided rake and wire sifting machines for purification of cooling water, particularly from condensers of steam power installations, are sometimes inadequate for purifying purposes. Rather, mussels accumulate in the cooling water which comes from the sea, downstream the mechanical purifying devices since the larva of the mussels are not retained by the sieves. The mussels can cause clogging in the individual water cooling pipes of the condensers. The growth of the new mussels can be stopped by adding chemicals. The amount of additives required however, often exceeds the permissible limits so that harmful side effects cannot be avoided.

A device is known which is used for the continuous separation of solid objects. According to this device a conical sieve is installed into the cooling water pipeline with its vertex against the flow direction, and the annular clearance, which occurs between the base of the sieve and the inside wall of the pipe widens at its narrowest point to become a torus-shaped channel. In this way the floating solid objects are swept along the sieve surface until they reach the torus-shaped channel at the end of the sieve where they are washed away by an auxiliary current.

The annular channel in this sieve, however, is located within the wall of the outside pipe. This may entail very considerable complications with certain raw materials for installing said channel into the supply pipe.

The object of the present invention is to offer a simpler and above all a space-saving arrangement of said torus channel.

To this end, and in accordance with the invention, the torus-shaped channel is located either completely or partly inside the cone-shaped sieve. In addition to making production easier, this arrangement also has the advantage that the solid objects floating along the sieve's surface arrive directly at the intake slot of the torus-shaped channel.

The distribution of the torus-shaped channel may be so carried out within the framework of the invention, that one portion of the channel is placed within the conical sieve while the other portion goes into the wall of the pipeline. Furthermore, the cross section of the torus-shaped channel may deviate from circular, e.g. it may be triangular, square or polygonal.

In the schematic drawing which shows an embodiment example according to the present invention in greater detail:

FIG. 1 is a longitudinal section through a piece of pipeline, with the respective sieve; while FIG. 2 is a cross section along line II–II through the torus channel.

In FIG. 1 a conical sieve 2 is shown in the pipeline 1 with its apex against the main flow direction. The width of the sieve opening preferably narrows from the apex toward the base. At an average opening width of about 8 mm., aperture diameters of 12 mm. may be provided at the apex and 6 mm. at the base. Between the base of the sieve 4 and the wall of the pipe 1, the annular clearance steadily narrows toward the end and widens into a torus-shaped, annular channel 5. The annular channel 5 is located, thereby, within the conical-shaped sieve 2.

FIG. 2 shows a section through the torus channel 5, in accordance with section line II–II. The pipeline 1 shows two nozzles 6 and 8 which extend into the channel 5, tangentially to the torus axis. Additional water flows through said nozzle 6 and 8 and produces a ring current or flow in the torus channel 5. This ring flow picks up the solid bodies which float in on the surface of the sieve and enter the torus channel 5, and discharges them through nozzle 7 which is also arranged tangentially. To stimulate the flow only one nozzle or more than two nozzles can be used, although two are shown.

Needless to say, the use of such a device for separating solid objects need not be limited to the purification of cooling water, and the separation of mussels or shells. Rather, it may be employed in all processes wherein an absolute removal of relatively large particles from fluid or liquid streams is essential.

We claim:

1. A device for continuous separation of solid objects from liquid currents in pipelines wherein a conical sieve, with its apex pointing against the flow direction, is installed into the pipeline, with the screen surface of said conical sieve at its normally largest diameter reduced in diameter and so constructed and arranged by said reduction to provide a torus-shaped channel between said screen surface at its base and the inside wall of said pipeline, with at least one nozzle providing means so that water may be introduced into said channel, with at least one outlet so that water may be removed from said channel, and said torus-shaped channel being located at least partly inside the conical sieve.

2. The apparatus of claim 1, wherein the torus-shaped channel is partly in the sieve and partly in the wall of the pipe.

3. The apparatus of claim 1, wherein the cross section of the torus-shaped channel is polygonal.

F-3957

PO-1050
(5/69)

UNITED STATES PATENT OFFICE
CERTIFICATE OF CORRECTION

Patent No. 3,537,593      Dated November 3, 1970

Inventor(s) KLAUS RUTHROF et al

It is certified that error appears in the above-identified patent and that said Letters Patent are hereby corrected as shown below:

In the heading the German priority number should read as follows: --P 16 11 143.6--.

SIGNED AND SEALED

FEB 23 1971

(SEAL)
Attest:

Edward M. Fletcher, Jr.
Attesting Officer

WILLIAM E. SCHUYLER, JR.
Commissioner of Patents